United States Patent [19]

Helldörfer et al.

[11] Patent Number: 5,107,433
[45] Date of Patent: Apr. 21, 1992

[54] METHOD OF INPUTTING STARTING AND DESTINATION POINTS INTO NAVIGATION SYSTEMS

[75] Inventors: Reinhard Helldörfer, Igelsdorf; Ulrich Kanzler, Stein; Hans Rauch, Fürth; Stefan Hartmann, Nuremberg, all of Fed. Rep. of Germany

[73] Assignee: Robert Bosch GmbH, Stuttgart, Fed. Rep. of Germany

[21] Appl. No.: 477,927

[22] PCT Filed: Nov. 10, 1988

[86] PCT No.: PCT/DE88/00698
  § 371 Date: Jun. 18, 1990
  § 102(e) Date: Jun. 18, 1990

[87] PCT Pub. No.: WO89/06399
  PCT Pub. Date: Jul. 13, 1989

[30] Foreign Application Priority Data

Dec. 30, 1987 [DE] Fed. Rep. of Germany ....... 3744532

[51] Int. Cl.⁵ .............................................. G06F 15/50
[52] U.S. Cl. ..................................... 364/444; 364/449; 73/178 R; 340/990; 340/995
[58] Field of Search .................. 364/443, 444, 449; 73/178 R; 340/988, 990, 995

[56] References Cited

U.S. PATENT DOCUMENTS

| 4,570,227 | 2/1986 | Tachi et al. | 364/444 |
| 4,796,189 | 1/1989 | Nakayama et al. | 340/990 |
| 4,937,753 | 6/1990 | Yamada | 340/990 |
| 4,943,925 | 7/1990 | Moroto et al. | 340/995 |
| 4,962,458 | 10/1990 | Verstraete | 364/444 |
| 4,984,168 | 1/1991 | Neukrichner eet al. | 364/449 |

Primary Examiner—Gary Chin
Attorney, Agent, or Firm—Michael J. Striker

[57] ABSTRACT

A method inputting starting and destination points into an electronic navigation system for motor vehicles in which relevant data of street system maps comprising a street identification character and reference point coordinates with assigned house numbers, are stored in a data storage. When inputting, the street identification character and house number of the starting and destination point are entered, then the data storage is first searched for the street identification character and then for the inputted house number. When there is agreement with a house number of the reference points in the data storage its coordinates are taken over for navigation. When there is a disagreement, the reference points adjacent to it in the data storage are determined and the coordinates of the starting or destination point are determined by means of interpolation and used for navigation (FIG. 20).

4 Claims, 12 Drawing Sheets

METHOD OF INPUTTING STARTING AND DESTINATION POINTS INTO NAVIGATION SYSTEMS

BACKGROUND OF THE INVENTION

The invention relates to a process for inputting starting and destination points into electronic navigation systems of vehicles.

In a navigation system designated TRAVELPILOT, it is known, according to the brochure BP-VFW/8699901010 of Blaupunkt-Werke GmbH, to show the respective road map with the instantaneous location of the vehicle on a monitor during navigation driving. In this system, the street name or a prominent location, such as a railroad station or airport, is inputted via keys prior to navigation driving. These given destinations contained in the data storage of the navigation system are then marked in the street map on the monitor. During navigation driving, the respective location of the vehicle on the street map is plotted by compound navigation. The respective remaining straight-line distance from the destination is superimposed on the monitor as additional data.

This system has the disadvantage that the data storage of the navigation system is not extensive enough to receive all of the street map data required for navigation. Thus, it is not possible to input a predetermined house from the houses on a street as a starting or destination address, since only a limited number of prominent buildings or building complexes are stored in the data storage of the street map as possible destination points. Therefore, with this navigation system, the driver of the vehicle is, in most cases, only guided to the street inputted as destination, so that he must still search for the destination point on the street, i.e. a building with a determined house number.

In another process for inputting and storing locations and destinations in a navigation data storage known from WO 86/01442, the polar coordinates of the starting and destination points are determined with a special measuring instrument from desired maps and inputted into the corresponding storage of the navigation computer together with the scale of the map via keys and displays. During navigation driving (driving of the vehicle under the control of the navigation system), the direction and distance of the selected destination point are then displayed by the compound navigation or in other words with the determination of the instantaneous position of the vehicle on the street map during the drive. This solution has the disadvantage that great care must be taken when determining and inputting the starting and destination points by their polar coordinates. Moreover, since the respective exact address, i.e. street and house number, can sometimes not be learned from the city maps or can only be estimated when inputting destinations, such destinations can neither be exactly inputted nor accurately approached by compound navigation.

SUMMARY OF THE INVENTION

The object of the invention is a method of inputting calling street and house numbers of the starting and destination points in navigation systems for vehicles in which street reference points of street system maps provided with house numbers are stored in a data storage.

According to the method invention, relevant reference points of streets of a street system map which are provided with house numbers, are available in the data storage with data protection from data of the heterogeneous data bases. The reference points are utilized when inputting starting and destination addresses for determining the starting and destination point of a navigation drive in the most accurate manner possible. An advantage of this process consists in that the storage capacity for the data storage of the navigation system can be considerably reduced by storing individual reference points of the street as compared to the storage of all the buildings of the street with their house numbers. Accordingly, it is possible to store electronically entire city maps of large cities in the navigation system.

The present invention both to its construction so to its method of operation, together with additional objects and advantages thereof, will be best understood from the following detailed description of specific embodiments when read in connection with the accompanying drawings.

DESCRIPTION OF THE PREFERRED EMBODIMENT

Figure 1:
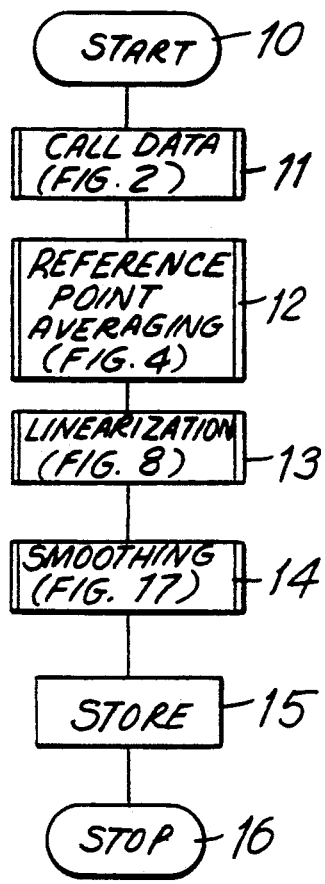
FIG. 1 shows a flow chart of a method for obtaining the relevant data of a series of streets.

FIG. 1 illustrates a flow chart which shows the method steps for attaining the relevant data for a street from a data base of a surveying office containing the focal-point coordinates of the houses on the selected street. It is assumed that a data base is necessary for navigating according to city map data; the simplest possible outline of the city map should be contained in the data base. The data must be in a form which is understandable for the navigation system and easy to manage. Information is required for each individual street, the course of the street, its geographical situation, and data on the distribution of the house numbers along the street follow from this information in suitable form.

The information about the house numbers on the street should allow conclusions to be drawn concerning the situation of a predetermined number on the street. For short streets or squares, the house number has little significance in principle, since in this case the only concern is to find the street or square at all. But the house number has greater importance when it is desirable to drive to a predetermined point in streets covering a large surface area. Since almost all German surveying offices possess collections of data concerning the focal points of property and houses for the areas under their jurisdiction, these collections of data are particularly suitable for obtaining relevant data of street system mapping for navigation purposes. The process sections, which are shown in FIG. 1 and described in more detail below, are run one after the other in an electronic data processing system for each street in the street system mapping.

After the start 10, in a first process section 11 for a selected street, the focal points of the houses located on this street are called from the heterogeneous data pool and stored temporarily. In process section 12, closely situated house focal points are averaged to a form a common focal point, so that a portion of the original data is dispensed with. In process section 13, the entire series of streets is linearized into one or more straight partial distances until all the houses within a predetermined band width lie next to the linearized course of the series of streets. The starting and ending points of the straight partial distances are stored temporarily and the remaining intermediate points are dispensed with. In process section 14, two consecutive linearized partial distances are smoothed to form a common new partial distance only when this new partial distance lying between the two end points of two adjacent previous partial distances does not exceed a predetermined distance from the common point lying in between. In this case, the point located between these two consecutive partial distances is also canceled. In process section 15, the remaining reference points with their coordinates and the house numbers assigned to them are stored in the data storage of the navigation device along with the identification character of the street. In step 16, the program is stopped. The same process is repeated for every other street of the street system map until all of the streets are included and the data relating to their mapping are stored in the data storage.

Figure 2:
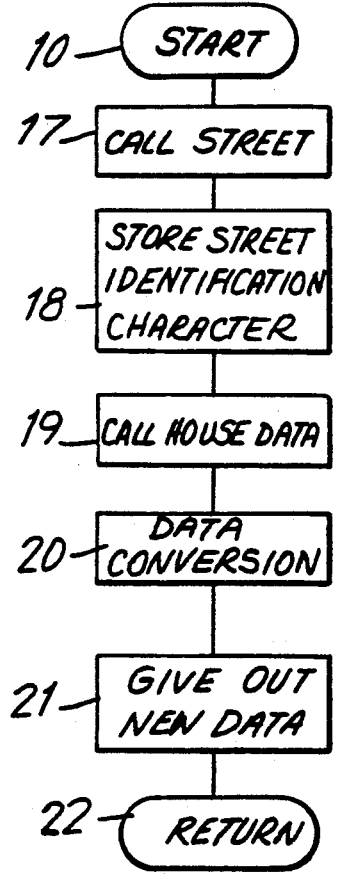
FIG. 2 shows a flow chart for calling intermediate storage of the data of a street.

The individual process sections from FIG. 1 are explained in more detail with the aid of the following figures from a data collection with the focal-point coordinates of houses. FIG. 2 shows a flow chart for calling the house focal-point coordinates, their conversion into ascending sequence of house numbers and their intermediate storage. A street is first selected from the street system map to be stored from the heterogeneous data base after the start 10. This street is now provided with an identification character, e.g. a four-digit number, which is subsequently registered in a street index of the street system map for start and destination input during navigation drives. The identification character, which increases with every newly called street, is now stored temporarily in step 18 for the selected street. In step 19, the data of the houses of this street are then called from the data base one after the other by ascending house numbers. Three data blocks are stored intermediately for every house, wherein the first block contains a three-digit house number. The second block contains the x coordinate of the house focal point and the third block contains the y coordinate. Since the coordinate values are in the form e.g. of Gauss-Krüger coordinates in a rectangular coordinate system with the equator as reference axis in a known manner and require a very great storage space, these coordinates are converted in step 20 into a coordinate system with a reference point within the street system map, e.g. the lower left-hand corner of the street system map. The focal point coordinates of the houses which are converted in this way now require substantially less storage space. The conversion is particularly simple to carry out if the new reference point is likewise to be taken from the data material with its Gauss-Krüger coordinates. In this case, the difference between the x and y coordinates of the house focal points forms the new reference point. The data of all houses of the called street which are obtained in this way are now stored temporarily with the house numbers as so-called reference points of the street in step 21.

Figure 3:
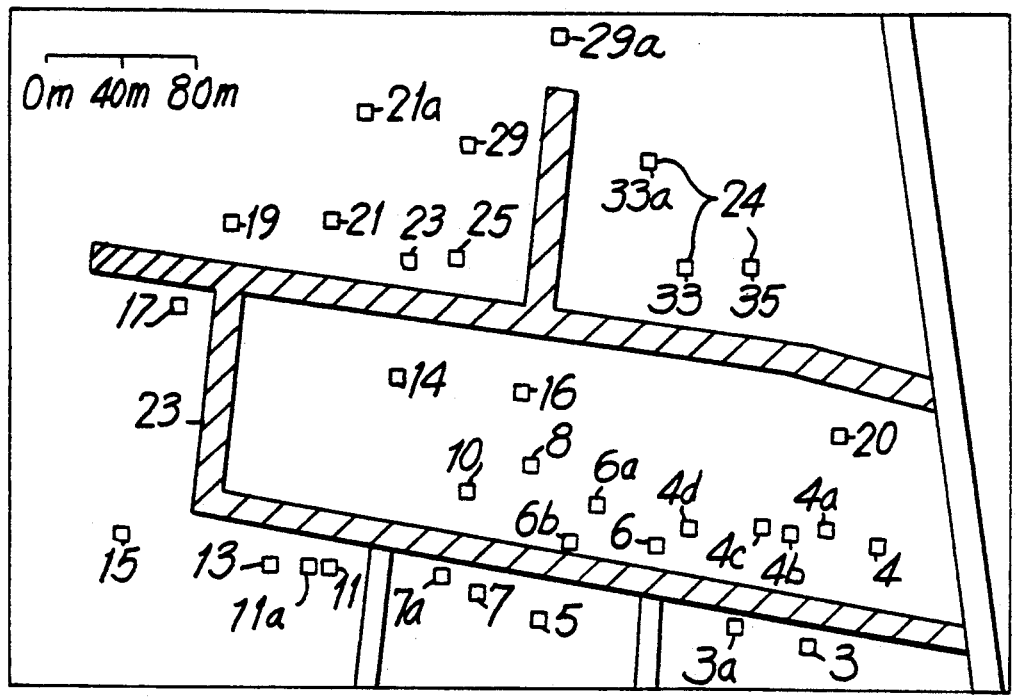
FIG. 3 shows the mapping of a street with focal-point houses as reference points of the street.

In FIG. 3, the course of a street 23 with blind alleys branching off from it, is shown in a defined region of the street system map to be stored. Moreover,, all reference points 24 stored there temporarily in the process section according to FIG. 2 are shown with their house numbers. From them the data relating to the street system mapping are to be obtained with the process according to FIG. 1. Caution must be exercised so that no additional data concerning the street is available other than the quantity of the reference points 24 with their coordinates. The actual street course which is plotted is not to be gathered form the heterogeneous data collection. At most it can be estimated from the situation of the house focal points and the distribution of the house numbers.

Figure 5:
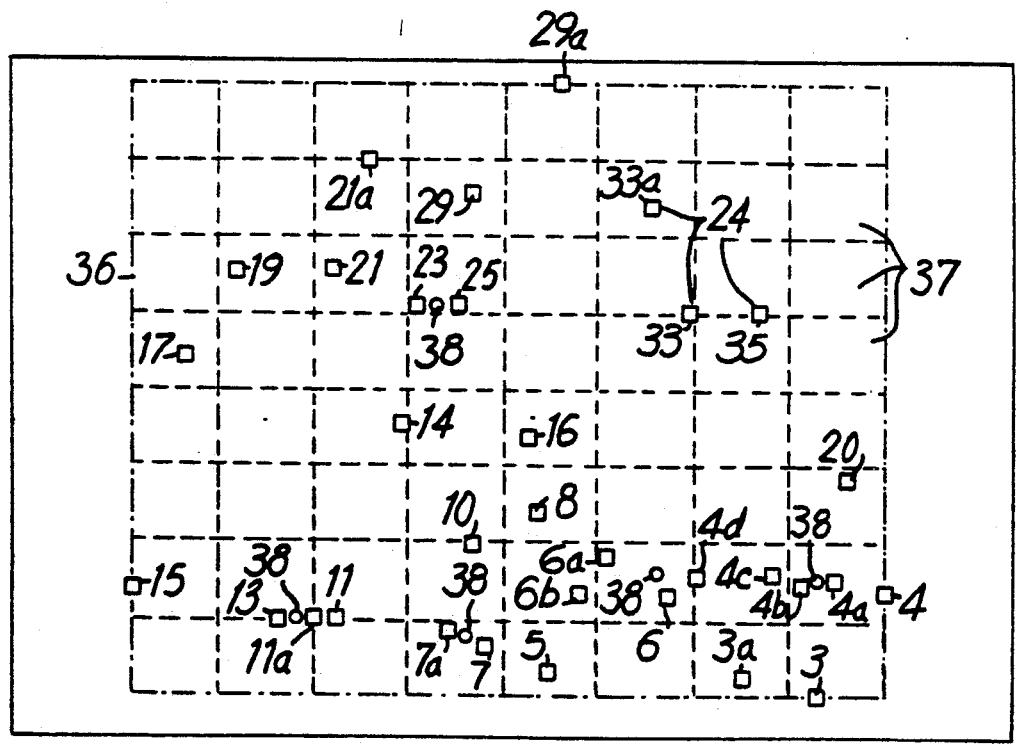
FIG. 5 shows the reference points of the street from FIG. 3 with a circumscribing rectangle, divided into subrectangles.
Figure 4:
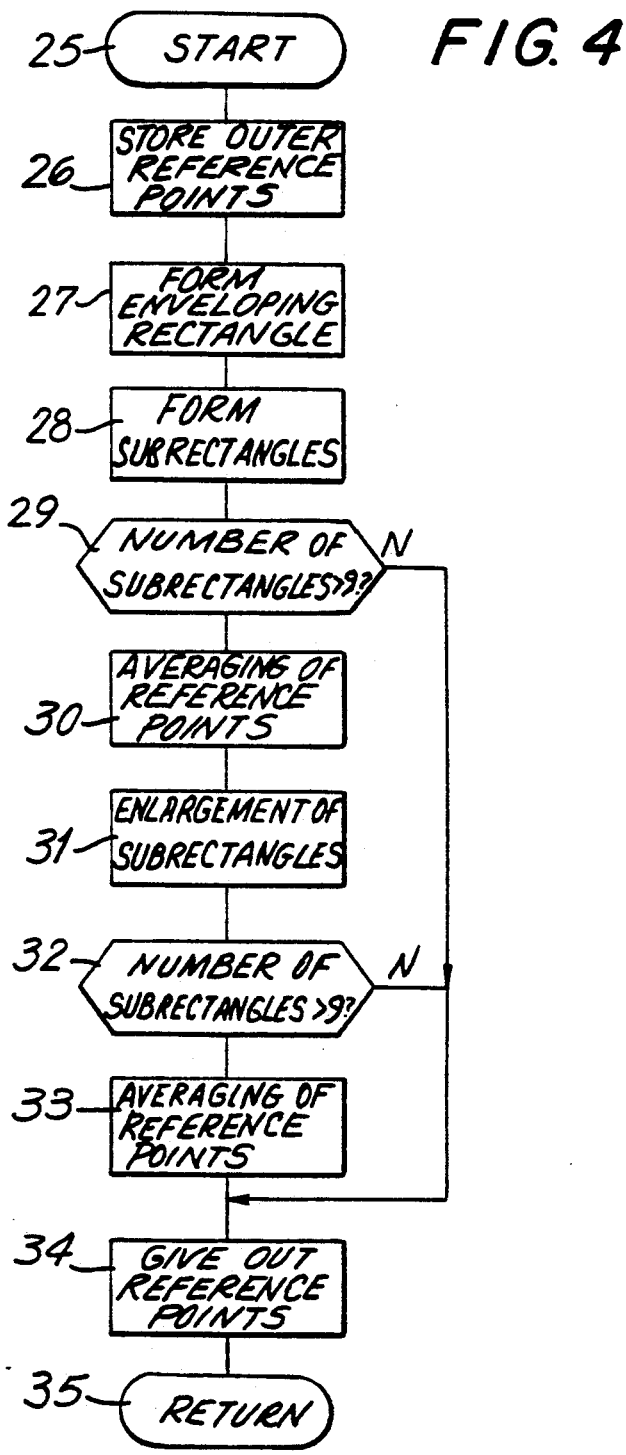
FIG. 4 shows a flow chart for averaging closely adjacent reference points of the street.

FIG. 4 shows a flow chart with which the quantity of reference points for the street is reduced by averaging the focal points of closely adjacent houses. After the start 25 of this program section 12 from FIG. 1, those reference points 24 of the street which lie furthest away are first determined and stored temporarily in step 26. A rectangle in which the x and y coordinates of these reference points are combined to form the corner point coordinates of the rectangle is then formed with these reference points in step 27. In FIG. 5 this rectangle, which comprises all reference points 24 of the street, is designated by 36. The rectangle 36 determined by the temporarily stored corner points is now divided up into a plurality of subrectangles 37 in step 28 according to FIG. 4. The number of subrectangles 37 is determined by the number of reference points 24 per street. It has proven advisable for the number of subrectangles 37 per rectangle to divide the number of reference points 24 by the number 4 and to round off the results.

FIG. 5 shows this subdivision for the street according to FIG. 3. In this example, there is a subdivision of the rectangle 36 into 8×8 subrectangles 37 with a total of 33 reference points of the street. These subrectangles 37 are also first stored temporarily with their corner point coordinates. However, such a subdivision is only to be carried out in streets having a minimum quantity of houses, e.g. at least 14 houses. Therefore, in step 29 of the flow chart from FIG. 4, a check is made as to whether or not the rectangle 36 was divided into more than nine subrectangles 37 in the preceding step 28. Since this is the case in the present example, all subrectangles 37 are checked one after the other in step 30 as to whether or not two or more reference points 24 lie in one or more of the subrectangles 37. If this is the case, the coordinates of the respective reference points 24 of such a subrectangle are averaged in step 30 and a focal point is formed from this, one of the house numbers of the averaged reference points 24 being assigned to this focal point, and this house number is then stored temporarily with the coordinates of the focal point. The previous reference points in this subrectangle can now be canceled. In so doing, it may possibly be advisable to assign to the focal point the house number of the reference point 24 lying closest to the focal point.

Figure 6:
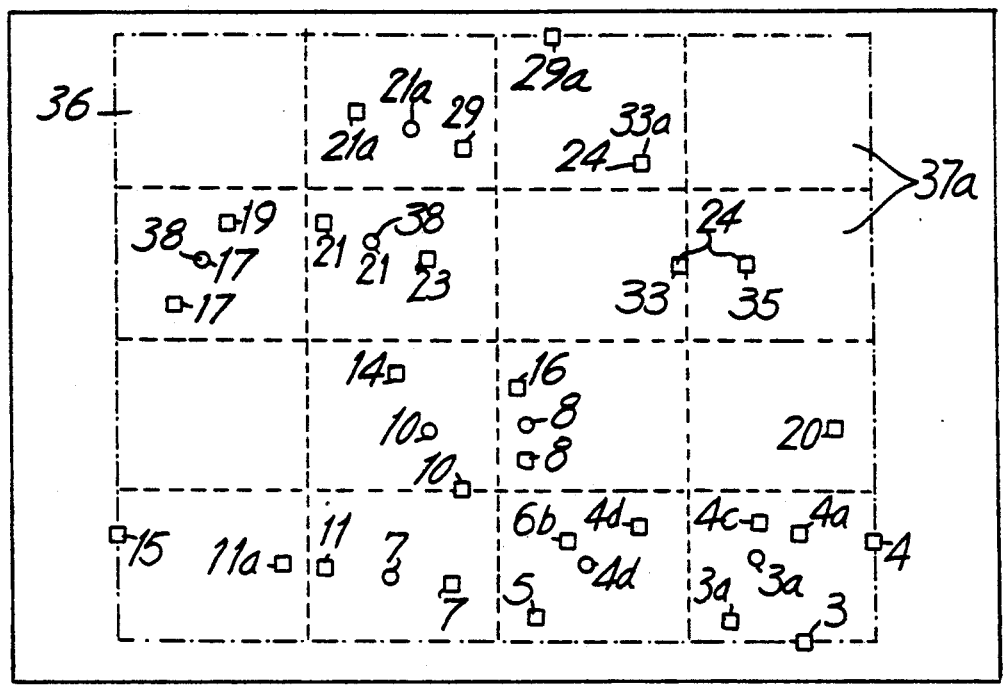
FIG. 6 shows a reduced number of reference points of the street from FIG. 3 with enlarged subrectangles.
Figure 7:
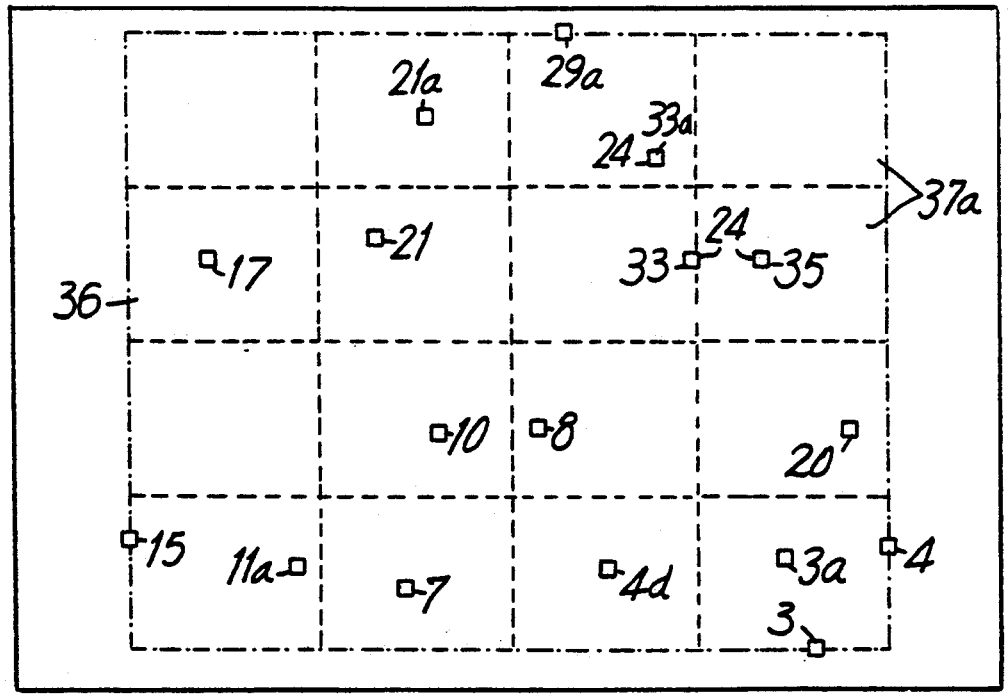
FIG. 7 shows the reference points of the street, according to FIG. 3, remaining after averaging twice.

In the example according to FIG. 5, five focal points 38 were formed by means of averaging and were stored in step 30 in five of the subrectangles 37, so that six reference points 24 can be canceled. In step 31, the number of subrectangles per side of the rectangle is now halved, i.e. the surface area of the subrectangles is increased by a multiple of four. FIG. 6 shows that the rectangle 36 has now been divided into 4×4 subrectangles 37a. In step 32 of the flow chart according to FIG. 4, another check is made as to whether or not the quantity of the subrectangles 37a formed in this way exceeds the number of nine subrectangles. Since this is the case in the example, all enlarged subrectangles 37a are now checked one after the other in step 33 as to whether or not more than two reference points 24 lie in one or more of the subrectangles 37a. In so doing, the outer reference points determined in step 26 are not taken into account. In step 33, an averaging of the coordinates of all reference points 24 included by a subrectangle 37a is now affected again. Eight additional focal points 38 are formed by means of this averaging according to FIG. 6, the lowest house number of the combined reference points of the respective subrectangle 37a being assigned to these focal points 38 in the example. These focal points 38 are stored temporarily as new reference points with the house numbers and coordinates assigned to them, and the previous reference points 17 of the respective subrectangles 37a can be canceled. FIG. 7 shows the relatively uniform new reference point distribution after averaging twice. The remaining original reference points 24 and the focal points obtained by means of averaging are now stored together in a data storage as reference points of the street with their coordinates, the house numbers assigned to them, and the street identification character in step 34; specifically, together with the four outer reference points of the street obtained in step 26, which outer reference points are not taken into consideration in the determination in steps 30 and 33. In this way, data relating to the street is obtained from a heterogeneous collection of data with the house focal points of a street while taking into consideration data protection regulations, and accurate navigation driving (driving of the vehicle under the control of the navigation system) is enabled with this data by means of inputting a starting and destination address with designation of the street identification character and house number in a system with a compound navigation. The storage requirement in the data storage of the navigation system is considerably reduced compared to the storage requirement in the heterogeneous collection of data.

In determining reference points according to the process section according to FIG. 4, it is important that the quantity of subrectangles be made dependent on the quantity of reference points 24 of the street in the first subdivision of the rectangle 36 comprising all reference points. When the houses are distributed along the street in a relatively uniform manner it is possible that no subrectangle 37 containing more than one reference point 24 will be found in step 30. In this case, the enlargement of the subrectangles 37 according to step 31 is carried out immediately. These process steps are consequently repeated until a focal point formation is carried out or until the number of subrectangles has been reduced to nine. If this is already the case in step 29, no averaging is carried out. The program then jumps immediately to step 34.

In order to find the beginning and end of the street, the reference points 24 with the highest and lowest house numbers are also stored in the data storage in step 34 of the flow chart in FIG. 4 as fixed reference points of the street with their coordinates for further processing or as relevant data of the street. In the example, the number of reference points 24 is reduced from 33 to 17 by averaging.

In a modification of the flow chart, according to FIG. 4, it may be advisable in steps 26–34 first to call only the reference points with even house numbers, store them temporarily, combine them in subrectangles possibly to form focal points, and store them with the house numbers assigned to them. The same process steps ar then carried out with the reference points of the street having an uneven number. Of course, the process steps can also be carried out in the reverse order with the uneven house numbers first and then with the even house numbers. The number of reference points of a street is decisive for the formation of the subrectangles 37, 37a. The number of reference points 24 should be divided by a whole number multiple of 1 for the number of subrectangles 37 to be formed per side of the rectangle 36 comprising the reference points 24. When there is a smaller number of reference points, it would have to be divided by 2 or 3. When there is a very large number of house reference points, it is advantageous to repeat the enlargement of the subrectangles 37 and the averaging and temporary storage, according to steps 30 and 33 from the flow chart according to FIG. 4, repeatedly until 3×3 subrectangles are obtained for every street.

If there are relatively few house focal points as reference points in a street, it is advantageous to select a large enough number of subrectangles per rectangle side when forming the subrectangles 37 so that there is no more than one reference point in any of the subrectangles. The subrectangles can then be increased until two reference points occur in one of the rectangles, a new focal point can now be formed from the two reference points by means of taking the average. After this first focal point formation, the subrectangles are now increased again until there are two reference points in another subrectangle. These reference points are now also combined by averaging to form another focal point and are stored temporarily in case the minimum number of nine subrectangles is not yet reached. The enlargement of the subrectangles can be repeated many times. However, the averaging and focal point formation should be limited to a maximum of two passes so that no excessive distortion of the reference points occurs.

Another reduction of the reference points of a street is achieved by means of a linearization of the series of streets which is carried out in section 13 of the flow chart according to FIG. 1. This process section follows the process for averaging and focal point formation according to FIG. 4. During the linearization, the reference points of the street achieved in the preceding process section are to be further reduced. In so doing, the existing reference points are first visualized as connected with one another in ascending or descending sequence of the house numbers assigned to them by means of a traverse which is then replaced by a simpler one. This simpler traverse is then examined as to whether or not it describes the predetermined traverse of the existing reference points with sufficient accuracy. If this is the case, the simple traverse, i.e. the reference points connected by it, is used directly and the remaining reference points are removed from the screen. If, on the other hand, reference points lie too far next to this simplified traverse, the latter is expanded and compared again with the reference points.

Figure 8:
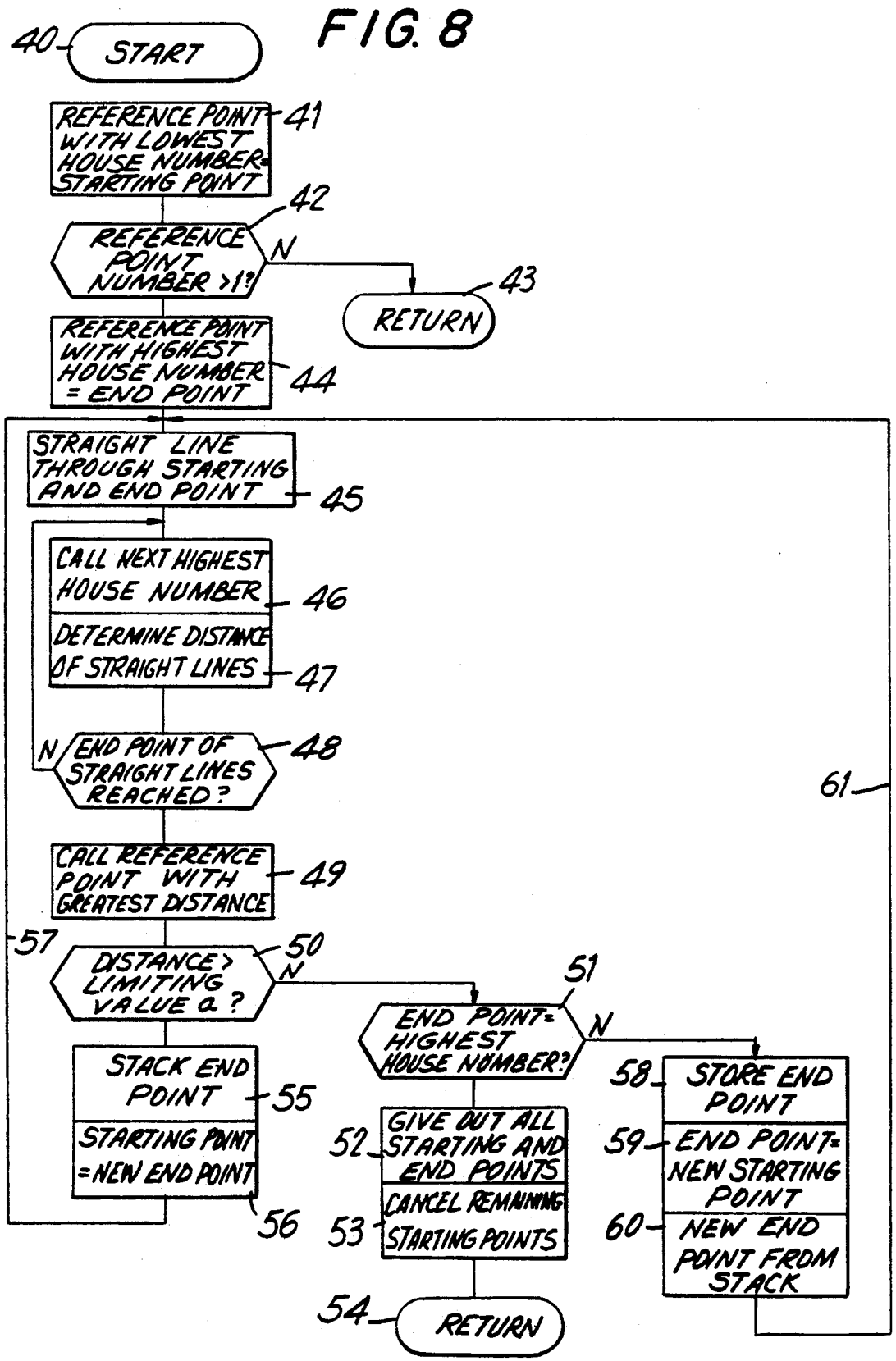
FIG. 8 shows a flow chart for the linearization of the street map.

In a flow chart, FIG. 8 shows the process section for the linearization of the street mapping on the basis of the reference points 24 of the street 23 from FIG. 3 achieved in FIG. 7. After the start 40, the reference point having the lowest house number is first called in step 41 from the existing reference points 24 of the street and stored as starting point. In step 42, a check is made as to whether or not there is a plurality of reference points for the called street. If this is not the case, then the called street must be a square or a very short street which is only characterized by one house. This reference point is then stored in the data storage as the only reference point of the street and the program jumps back to the main program in step 43. If there is a plurality of reference points 24—as in the present case—the reference point with the largest house number is called in step 44 and stored temporarily as end point. The rest of the process section is now explained with the aid of FIG. 9. In the latter, the starting point has house number 3 and the end point is house number 35. In step 45, a straight line A is made through the starting and end points in mathematical form. In the next step 46, the reference point with the next highest house number proceeding from the starting point is called and the vertical distance of this starting point from the straight line A is measured and stored temporarily in step 47. In step 48 a check is made as to whether or not the end point of the straight line A is reached. As long as this is not the case the reference point with the next highest house number is called in a loop in step 46 and its distance from the straight line A is measured again in step 47 and stored temporarily. Finally, if the end point on this straight line is reached, the reference point with the greatest temporarily stored distance from the straight line A is called in step 49; in the example this is the reference point with house number 15, whose perpendicular line relative to the straight line is shown in a dash-dot line. This distance b is now compared in step 50 with a predetermined limiting value of which forms a tolerance area to the left and right of the straight line A. This limiting value is given at 40 m in the example. If all reference points lie within the area described by this limiting value a to the left and right of the straight line A, the course of the street is assumed to be sufficiently linearized by this straight line A. A check is made in step 51 as to whether or not the present end point has the highest house number. If this is the case, the starting point and end point are given out as remaining reference points of the street in step 52 and all remaining reference points are canceled in step 53. The program now jumps back into the main program according to FIG. 1 in step 54.

Figure 9:
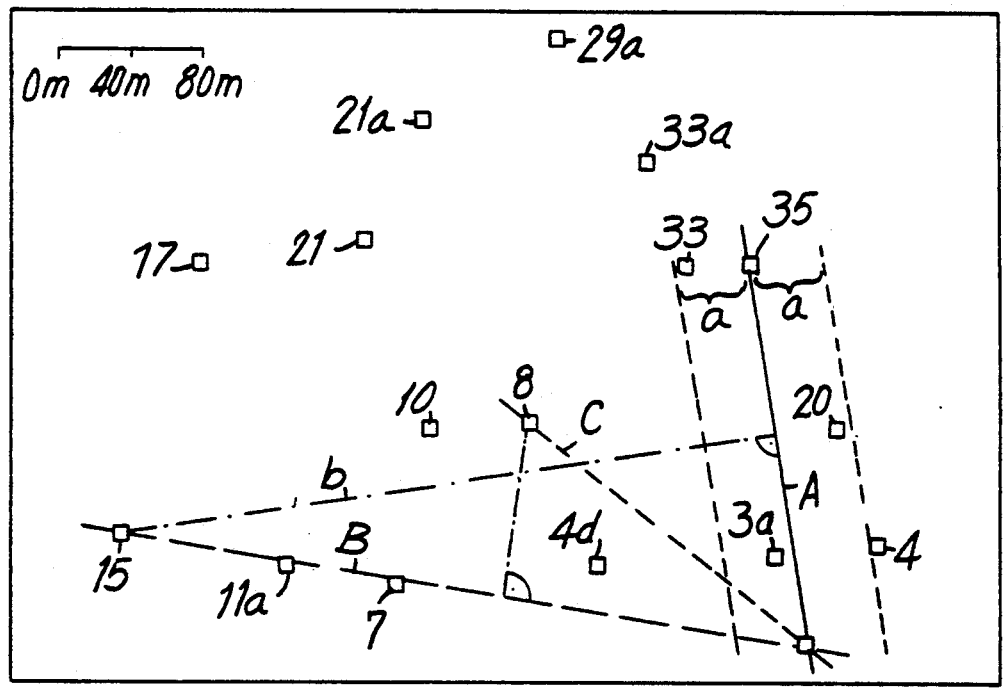
FIGS. 9 to 15 show the view of the street reference points with individual portions of the linearization.

However, in the example according to FIG. 9, the distance b of the reference point with house number 15 is greater than the predetermined limiting value a. The previously used end point, i.e. the reference point with house number 35, is now given in a stack in step 55 and the obtained reference point with house number 15 is included as a new end point in step 56, and program steps 45–50 are run through again via a loop 57, wherein the straight line B is formed in step 45 and the reference point with house number 8 is found in step 49 as the one with the greatest distance from the straight line B. In step 50 it is determined again that this reference point with house number 8 has a distance which is greater than the limiting value a. The previous end point with house number 15 is therefore placed in the stack in step 55 and the reference point with house number 8 is included in step 56 as the new end point. The program can now be run through again via the loop 57.

Figure 10:
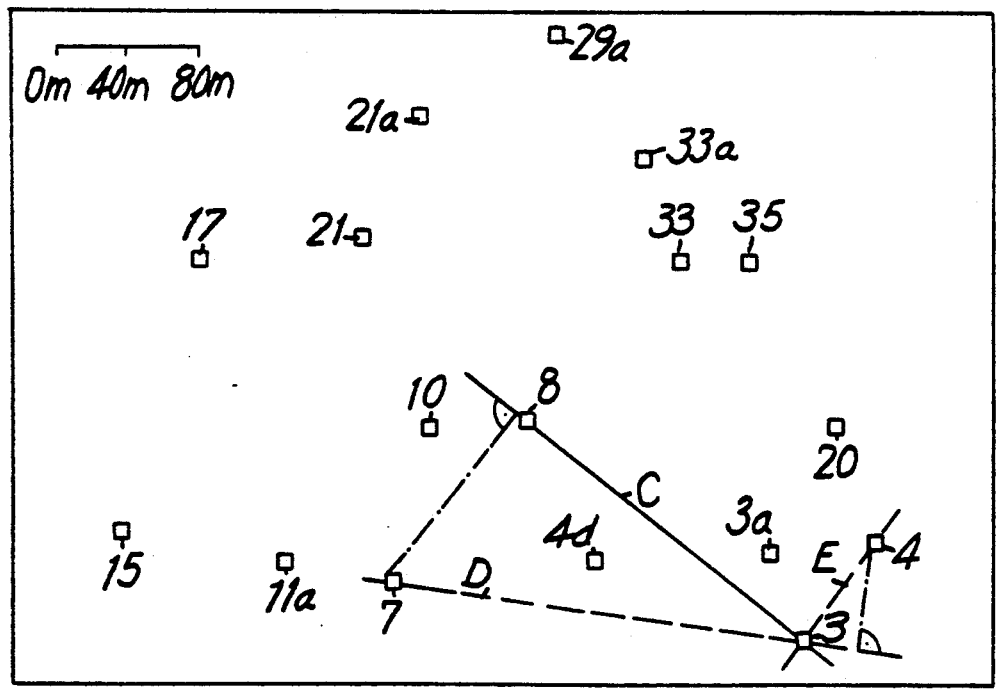

FIG. 10 shows that a reference point with house number 7 is found again by means of this new loop running of the program according to FIG. 8 with the straight line C, the distance of the reference point from the straight line C being greater than the predetermined limiting value a. The program section via the loop 57 must therefore be run through again, wherein the straight line D is now formed. The distance of the reference point with house number 4 now exceeds the limiting distance a again, so that the straight line E is now formed via the loop 57 of the flow chart.

Figure 11:
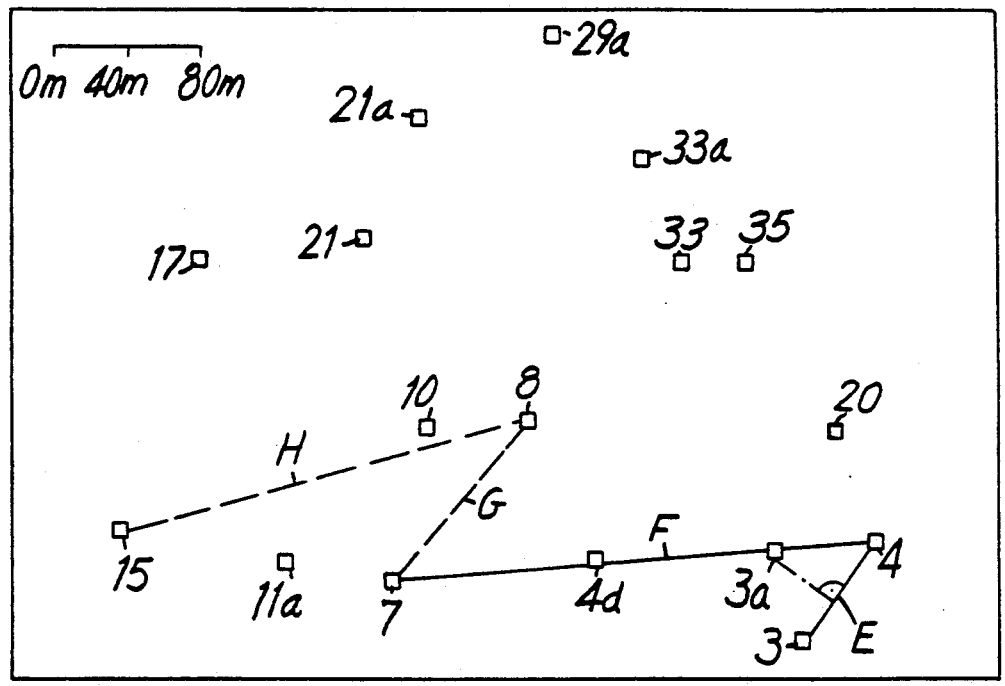

FIG. 11 shows that the remaining reference point with house number 3a now has a distance from the straight line E which does not exceed the predetermined limiting value a. In step 51 of the flow chart according to FIG. 8, a check is made as to whether or not the end point with house number 4 found in this way is simultaneously the highest house number of the street. Since this is not the case in the example, the end point found in this way is stored in step 58 and this found end point is now set as new starting point in step 59. The last end point stacked in step 55 is now removed from the stack as new end point in step 60 and the previous process steps 45–60 are run through again via the loop 61. In the example, the point with house number 7 is found as new end point in step 60 and the straight line F is accordingly formed in step 45 according to FIG. 11. In this case, also, the intermediate reference points are within the limiting value, so that the end point with house number 7 is stored in step 58 and is the new starting point in step 59. The reference point with house number 8 is called from the stack in step 60 as new end point and the straight line G is accordingly formed. In the same way, the straight line H is subsequently found. The reference point with house number 11a also does not lie outside the limiting value, so that the reference points with house numbers 8 and 15 are finally also stored in step 58.

Figure 12:
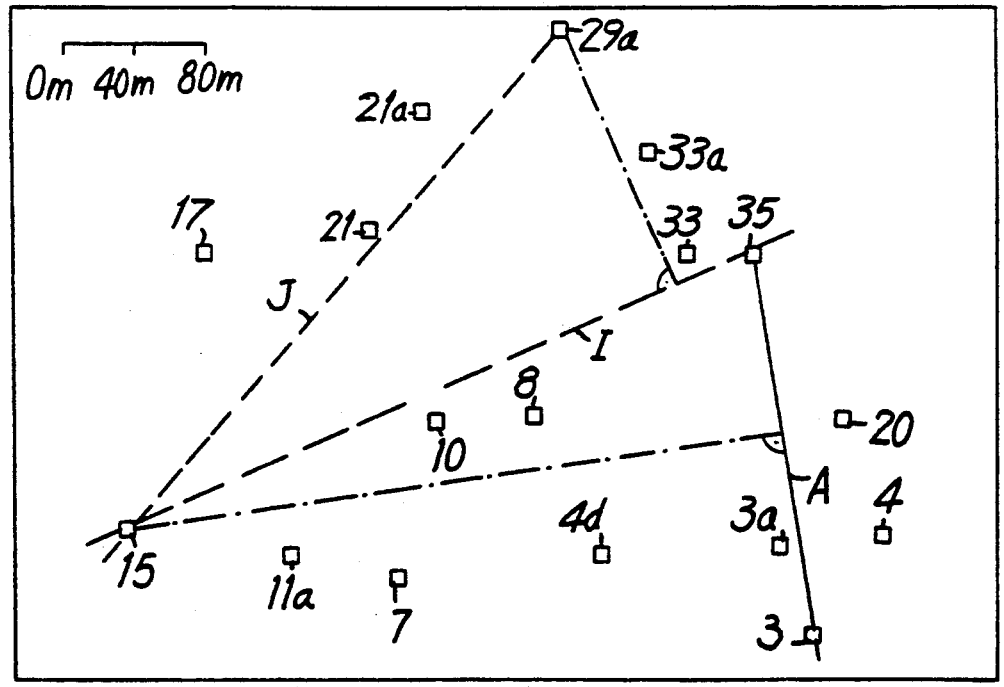

As shown in FIG. 12, the point with house number 35 is now removed from the stack as new end point in step 60 of the flow chart according to FIG. 8, and steps 45–60 are now run through via the loop 61 again in the described manner until the reference point with the highest house number is recognized as end point in step 51. With respect to FIG. 12, this means that the reference point with house number 29a is first found as new end point with the straight line I and that the straight line J is then formed between the new starting point and end point.

Figure 13:
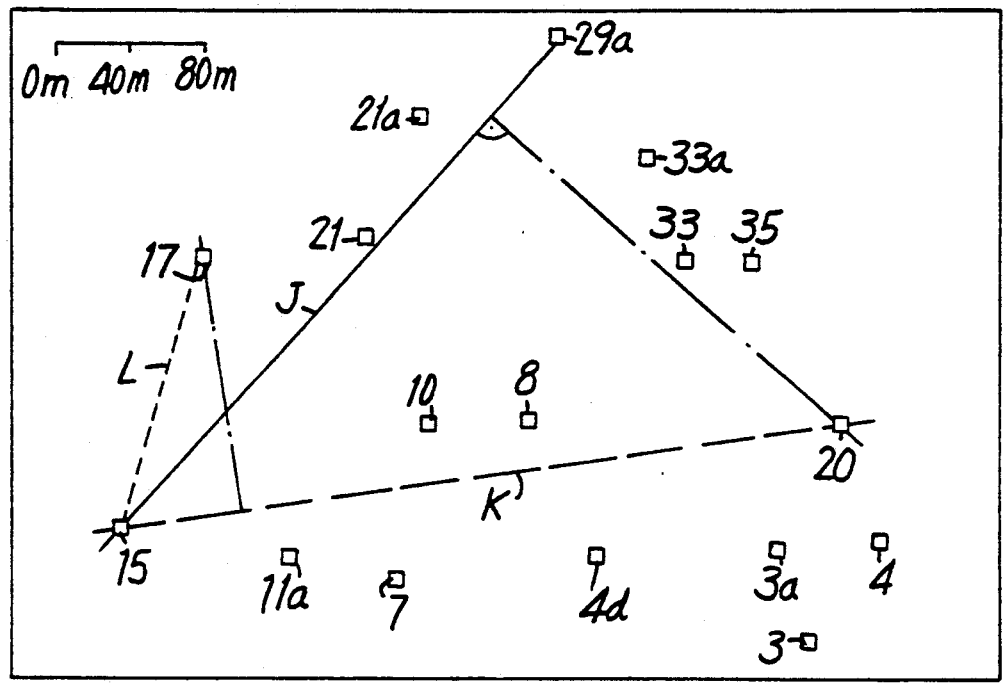

FIG. 13 shows that a new end point with house number 20 is found again with the aid of the straight line J and the straight line K is accordingly formed. The reference point with the house number 17 is now found by means of the straight line K and the straight line L is accordingly formed. Since no further reference points lie between the starting point and end point of the straight line L, the reference point with house number 17 is now stored in step 58 of the flow chart according to FIG. 8.

Figure 14:
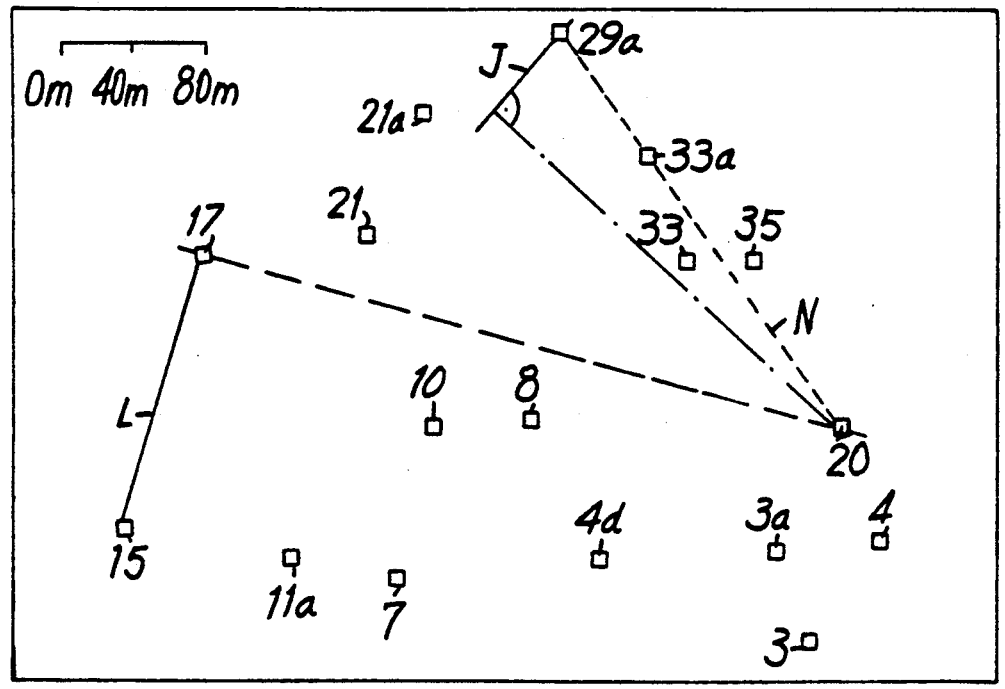

FIG. 14 shows that the straight line M is now placed between the reference point with house number 17 and the new end point with house number 29 which is removed from the stack and that no further reference points lie between the starting point and end point of this straight line M, so that the end point with house number 20 is now stored in step 58 and the straight line N is formed with the new end point with house number 29a which is removed from the stack.

Figure 15:
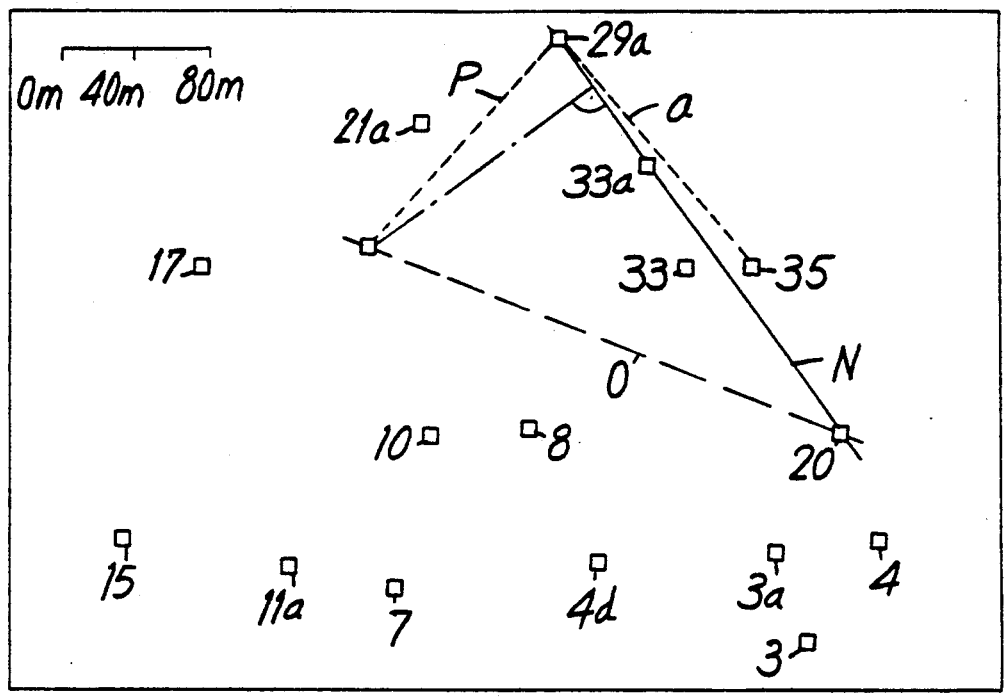

It can be seen from FIG. 15 that the reference point with house number 21 lying outside the limiting value a is found as new end point via the straight line N, which new end point now forms the straight line O with the starting point. Since no further reference points lie between the starting point and end point of the straight line O, the end point with house number 21 is consequently also stored in step 58 and subsequently forms the straight line P with the new end point 29a. Since the reference point with house number 21a lies at a distance from the straight line P within the limiting value a, the end point with house number 29a is now also stored in step 58. The reference point with house number 35 is now removed from the stack as new end point in step 60 and the straight line Q is accordingly formed. Since the intermediate reference points in this instance also do not exceed the limiting value a, this end point is finally recognized in step 51 as reference point with the highest house number. The original starting point with the lowest house number as well as all end points stored in step 58 are now transferred to a data storage in step 52 and all remaining reference points are canceled in step 53.

Figure 16:
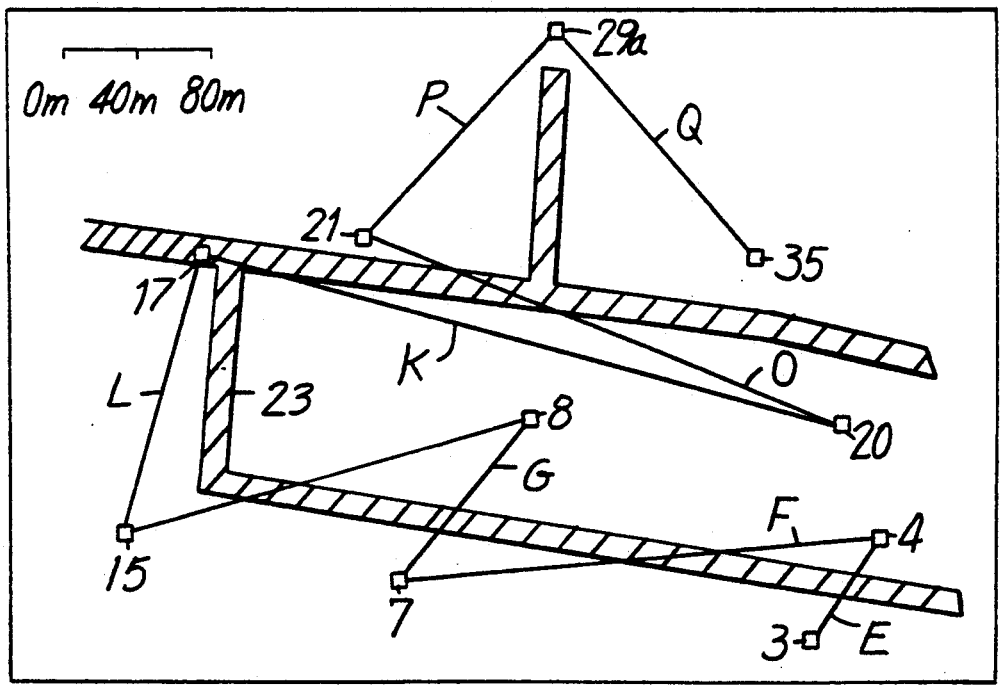
FIG. 16 shows the street mapping by means of a traverse (a connecting line between various points) after linearization.

FIG. 16 shows a traverse formed in this manner between the remaining reference points, which traverse comprises partial distances or sections of the straight lines E, F, G, H, L, K, O, P, Q. The course of the street 23 to be mapped is shown in approximate form by means of this traverse. A jumping back into the main program according to FIG. 1 is therefore affected in step 54 of the flow chart according to FIG. 8.

By this process, a linear street course is first assumed from the focal point of the house with the lowest house number and that with the highest house number and a check is made as to whether or not this street course describes the positions of all house focal points with sufficient accuracy. If all the points lie within the area described by the predetermined limiting value to the left or right of the formed straight lines, the course of the street is determined with sufficient accuracy by means of this straight line. However, if reference points are found, as in the example, which have a greater vertical distance than the predetermined limiting value, the previous straight line must be further improved by means of a traverse. For this purpose, the found reference point which is at the furthest distance from the new traverse is accepted and the process is repeated with the partial distances or straight lines which are accordingly formed. In so doing, only those reference points are considered whose house numbers lie between the respective starting and end points of the partial distances or straight lines. FIGS. 9 to 15 show the respective successively formed straight lines by means of solid lines, lines with widely spaced dashes and lines closely spaced dashes.

The final traverse shown in FIG. 16 has only 10 reference points compared to FIG. 9 with 17 reference points. It is also possible to carry out a reduction of the reference point data from the data from the heterogeneous collection of data for every street without averaging or focal point formation, respectively, in process section 12 of the main program according to FIG. 1 by skipping over the averaging process according to the flow chart from FIG. 4. In the same way, the starting and end points are then determined with the flow chart according to FIG. 8 by means of the data of the reference points with the highest and lowest house numbers of the street by storing them in the data storage and then forming an intermediate straight line. The coordinates of the temporarily stored reference points of the street are then called one after the other and the distance of the reference points from the straight lines is determined. The greatest distance found is compared with a predetermined limiting value. In the event that the greatest reference point distance is less than the limiting value, only the data of the reference points with the highest and lowest house numbers and the street identification character are stored in the data storage. On the other hand, all remaining reference point data of the street are suppressed. In the event that the greatest reference point distance is greater than the limiting value, this reference point is temporarily stored as new end point with its house number and a new first straight line is formed between it and the reference point with the lowest house number. A new second straight line is formed between it and the reference point with the previously highest house number. These process steps are now repeated for every new straight line until all reference point distances are less than the predetermined limiting value. The distances of the reference points from the respective straight lines are progressively determined proceeding from one end of the street or from a starting or end point, respectively.

In a modification of the process flow according to FIG. 8, a linearization of the street to be mapped can also be realized with the aid of the existing reference points in that the distances of the reference points from the straight lines are progressively determined proceeding from the starting point, temporarily stored and compared with the respective previous reference point distance until the distance of the current reference point is reduced relative to the previous reference point. The temporarily stored greatest reference point distance is then compared with the predetermined limiting value. In the event that the reference point distance is smaller than the predetermined limiting value, the reference point distances continue to be progressively determined and compared with one another. The greatest reference point distance determined is then compared with the predetermined limiting value again. As soon as a reference point distance is found which is greater than the predetermined limiting value, it is stored temporarily as new end point. The process steps are now repeated until all reference points lying between the starting point and the new end point are at a distance from the straight line which is within the predetermined limiting value. The obtained end point is now stored as a new starting point and all intermediate reference points are canceled. A new straight line is now formed between the new starting point and the end point of the street and the distances of the intermediate reference points from the new straight line are again compared with one another and with the predetermined limiting value in the manner described above. In this way, the course of a street is mapped in that the reference points which are finally stored in the storage are tracked through a traverse with linear portions at a predetermined limiting value of e.g. 50 m until the deviation of the determined reference points from the actual course of the street hardly exceeds the limiting value.

The process section described with the flow chart according to FIG. 8 for the linearization of the course of the street can likewise be carried out separately by means of reference points with even house numbers and reference points with odd house numbers. During navigation driving, houses can accordingly be found on a street with sharply divergent building density in an improved manner.

After running through the linearization in section 13 of the main program according to FIG. 1, a smoothing of the traverse obtained for the street mapping, shown in FIG. 16, is carried out in section 14. This process section is explained in more detail with a flow chart in FIG. 17. After the start 62, a check is first made in step 63 as to whether or not there are more than two reference points for the street mapping. If this is not the case, a linearization can not be carried out, since it is assumed in this case that the street runs linearly between the two reference points which mark the beginning and end of the street. Therefore, a jumping back into the main program according to FIG. 1 is affected in step 64. However, if three or more reference points are provided for the street mapping, the reference point with the lowest house number is called first in step 65 and stored as starting point in step 66. On the street map according to FIG. 16, this corresponds to the reference point with house number 3. In step 67, the reference point with the next highest house number, house number 4 in this example, is called and temporarily stored. In step 68, the next highest reference point after the latter, house number 7 in this example, is called and temporarily stored as end point. In step 69, a straight line is placed mathematically between the starting point and the end point and in step 70 the distance of the intermediate reference point from the straight line is measured. In step 71, this distance is compared with a limit which is given as 10 m in the example. If the determined distance of the mean reference point is not greater than the limit, a smoothing is affected between the starting point and end point of the straight lines in that the mean reference point is now canceled in step 72 and the end point is used in step 73 as new starting point. However, if the determined distance of the mean reference point—as in the example according to FIG. 16—is greater than the predetermined limit, the mean reference point is stored temporarily in step 74 as new starting point. In step 75, a check is made as to whether or not there are additional reference points for the street mapping aside from the three reference points already determined. If this is the case, as in the example, the new starting point is stored again temporarily in step 66 via a program loop 76 and the described process in steps 66-75 is repeated until no further reference point of the street is found in step 75. In step 77, the first starting point, the last end point and the intermediate starting and end points are given out as reference points for a street mapping which is now smoothed, and a jumping back to the main program according to FIG. 1 is affected in step 78.

Figure 17:
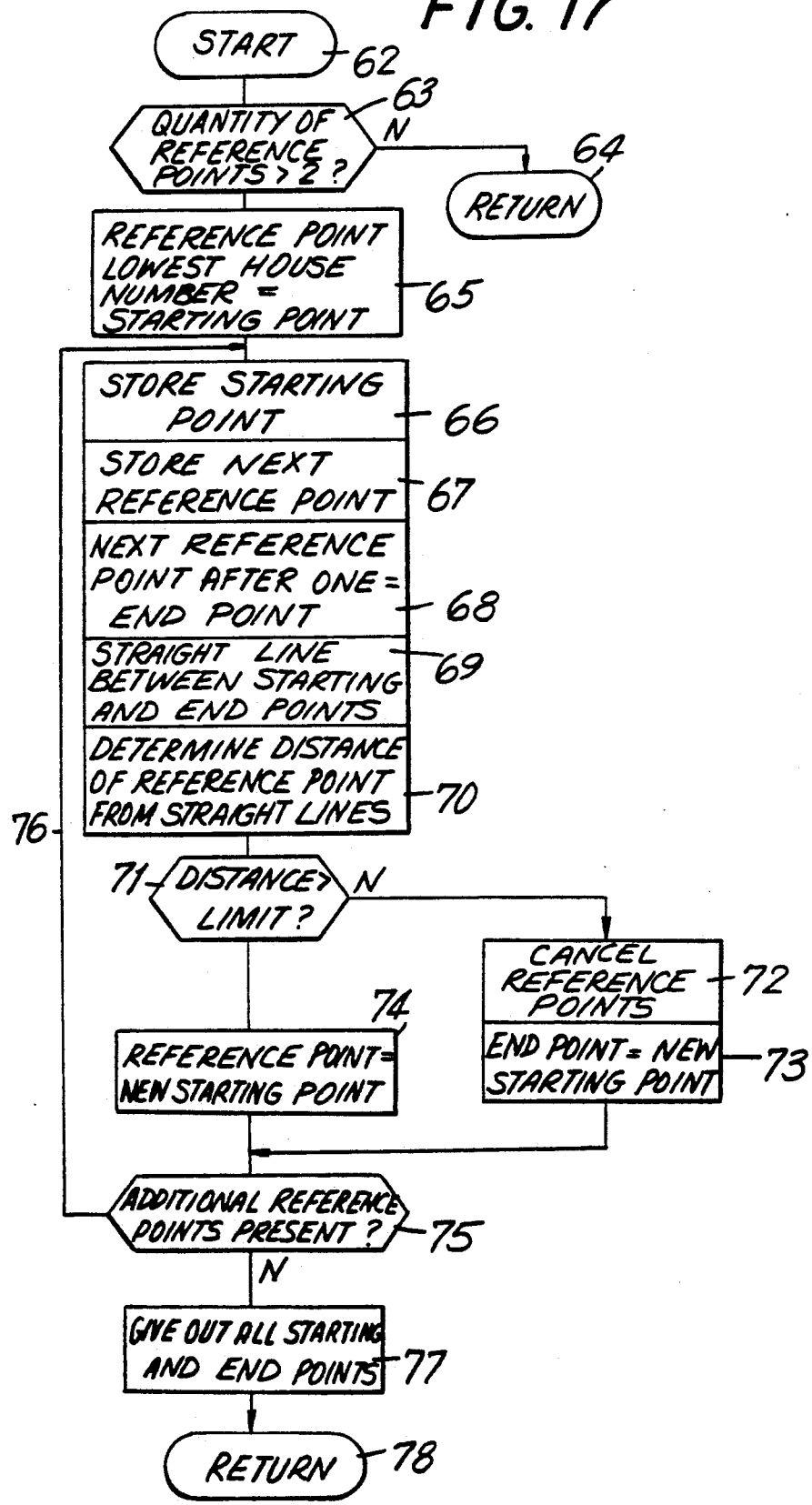
FIG. 17 shows a flow chart for smoothing or flattening the street mapping.

In the example according to FIG. 16, no further reference point which would enable a reduction of the reference point number by means of the smoothing process according to FIG. 17 could be found within a limit of 10 m. This is primarily because the actual course of the street 23 is sharply angled. In other street configurations, however, some reference points can be economized by means of this smoothing process.

On one hand, proceeding from the heterogeneous collection of data, sufficient relevant data for the mapping of the streets are determined with the described process sections for a street system mapping and are stored in a data storage for purposes of navigation, so that a destination indicated by means of street and house number can be found by a vehicle with compound navigation. On the other hand, the data removed from the heterogeneous collection of data are selected by means of the described process sections via averaging and focal point formation, linearization and smoothing in such a way that existing collections of data can accordingly be referred to while taking into account data protection regulations.

The motor vehicle navigation system known from WO 86/07142 is not suitable for the use of stored street system mapping which has been obtained from a heterogeneous collection of data according to the previously described process. It must be expanded and modified in such a way that the storage of the starting point and the destination points of a distance to be traveled can be carried out by means of inputting the street and house number corresponding to these points.

An input routine is needed which can be called up as an alternative to the known inputting of distance and angle relative to the destination point. It is the object of this routine to determine suitable data for navigation from the input values for the street and house number of the starting and destination points. This is affected with the aid of reduced city map data in the form of street reference points which must be available to the system as a data base in a data storage such as a ROM, diskette, CD disk, cassette or the like.

In order to keep the storage requirement for the city map data within acceptable limits, the clear text input of the street name is dispensed with. Rather, the streets are identified by means of an identification number allotted to them which can be taken from a list. Such a list is included as software with the navigation system of the vehicle. The identification numbers allotted to the streets can be taken directly out of the data of surveying offices. On the other hand, if the list of street names with the identification numbers is stored in a data storage of the navigation system together with the street system mapping, the street name can be called by means of clear text input when inputting the starting and destinations points. The corresponding identification number is then determined by the navigation system from the stored list or data.

Figure 18:
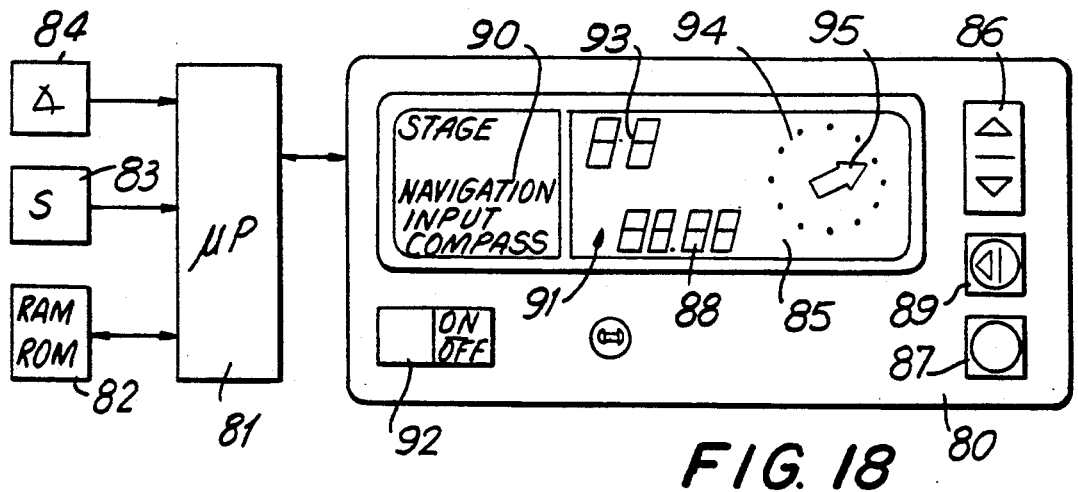
FIG. 18 shows the block wiring diagram of a navigation system in the motor vehicle.

FIG. 18 shows the navigation system for a motor vehicle in which starting and destination points can be inputted for destination-finding navigation. It comprises an input and output unit 80, a microprocessor 81 with a data storage 82, as well as a distance transmitter 83 and a driving direction transmitter 84. The microprocessor 81 processes the data coming from the distance transmitter 83, direction transmitter 84 and operating keys of the input and output unit 10 and further controls the output of data and direction arrows on a liquid crystal display 85 of the unit 10. The navigation system is operated with five operating keys. Numerical values can be changed so as to be larger or smaller on the LCD 85 with a rocker key 86. The actual numerical value indicated on the LCD 85 which appears in the lower area of the LCD 85, e.g. on a four-digit seven-segment display 88, is stored by actuating an acknowledgement key 87. The switching of the navigation system within an offered menu according to lettering 90 on the left-hand side of the edge area of the unit 80 is affected with a function selection key 89, wherein the information displayed on the LCD 85 is highlighted by means of an arrow 91 of the LCD 85 at the level of the lettering 90. An additional key switch 92 serves to switch the navigation system on and off. A two-digit seven-segment display 93 in the upper LCD area serves to designate 99 different allowed destinations or intermediate destinations. A rosette shape 94 of the LCD 85 with 16 different invisible arrow elements serves for the directional information, wherein the controlled directional arrow 95 shows either the northern direction or the direction of the destination to be approached. Instead of the rocker key 86, a keyboard can also be used for the numerical input.

The input of the starting and destination points will now be explained in more detail with the aid of the flow chart according to FIGS. 19 and 20. The INPUT menu is selected via the selecting switch 89 after switching on the navigation system by means of the key switch 92; in the INPUT menu the selecting key 89 is pressed until the indicator 91 at the left-hand edge of the display points to "INPUT". The usual input of distance and angle relative to the north known from WO 86-07142 is called between starting and destination point by means of briefly pressing the acknowledgement key 87. In order to arrive at the input routine for street and house numbers, the acknowledgement key 87 must be pressed for approximately 2 seconds until the intermediate destination number 93 begins to blink on the LCD 85. The desired input mode is now selected. The intermediate destination number to be programmed can now be changed with the rocker 86. When the desired intermediate destination is indicated, the programming can be begun by pressing the acknowledgement key 87. The input can be interrupted at any time by means of pressing the selecting key 89; the "NAVIGATION" menu then appears.

Figure 19:
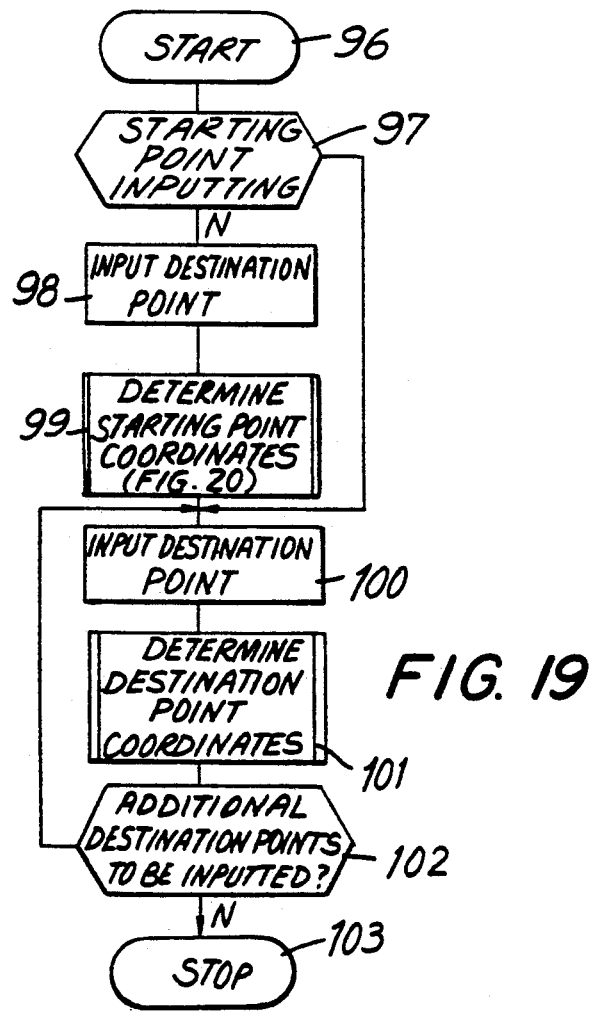
FIGS. 19 and 20 show flow charts for start and destination input into the navigation system.

According to FIG. 19, it is determined in step 97 after the start 96 of the input routine whether or not the programming has commenced anew or is being carried out for the first time. In the latter case, the system first requires the inputting of a starting point in step 98. In contrast to the programming with the use of distance and angle relative to the destination, the inputting of a starting point is necessary in order to maintain a reference point for the coordinates, proceeding from which the system can convert the right-angle coordinates from the data into polar coordinates. When the acknowledgment key 87 is pressed, the text "street" appears on the display 88, with which the system requests the input of the street number. The acknowledgment key 87 must now be pressed again in order to enter the street number. The navigation system now gives the lowest street number contained in the data from the data storage 82 with the street system mapping. The desired street number can be set with the rocker 86. When this occurs, the process must be terminated by means of pressing the acknowledgment key 87. The house number is entered in the same manner. The lowest house number in the called street is first set and can be changed with the rocker 86. The system allows only house numbers which lie between the lowest and the highest stored house number of the called street, so that it is possible in every instance to interpolate the coordinates from the data of the stored reference points with the house numbers assigned to them.

When the correct house number is set, this must be confirmed by means of pressing the acknowledgement key 87. This is followed by a conversion of the entered data of the starting point into the coordinates of the starting point in step 99 with a subprogram according to FIG. 20, which is explained in the following. After the start is entered, the navigation system requires that the destination point be entered in step 100. This proceeds in exactly the same way as the inputting of the start, and the coordinates of the destination point are determined and stored with the subprogram according to FIG. 20 in step 101. In step 102, a check is then made as to whether or not additional destination points are to be entered for additional intermediate destinations. The inputting can be terminated in step 103 by means of pressing the selecting key 89. Additional destination inputs can be begun by means of pressing the acknowledgement key 87.

Figure 20:
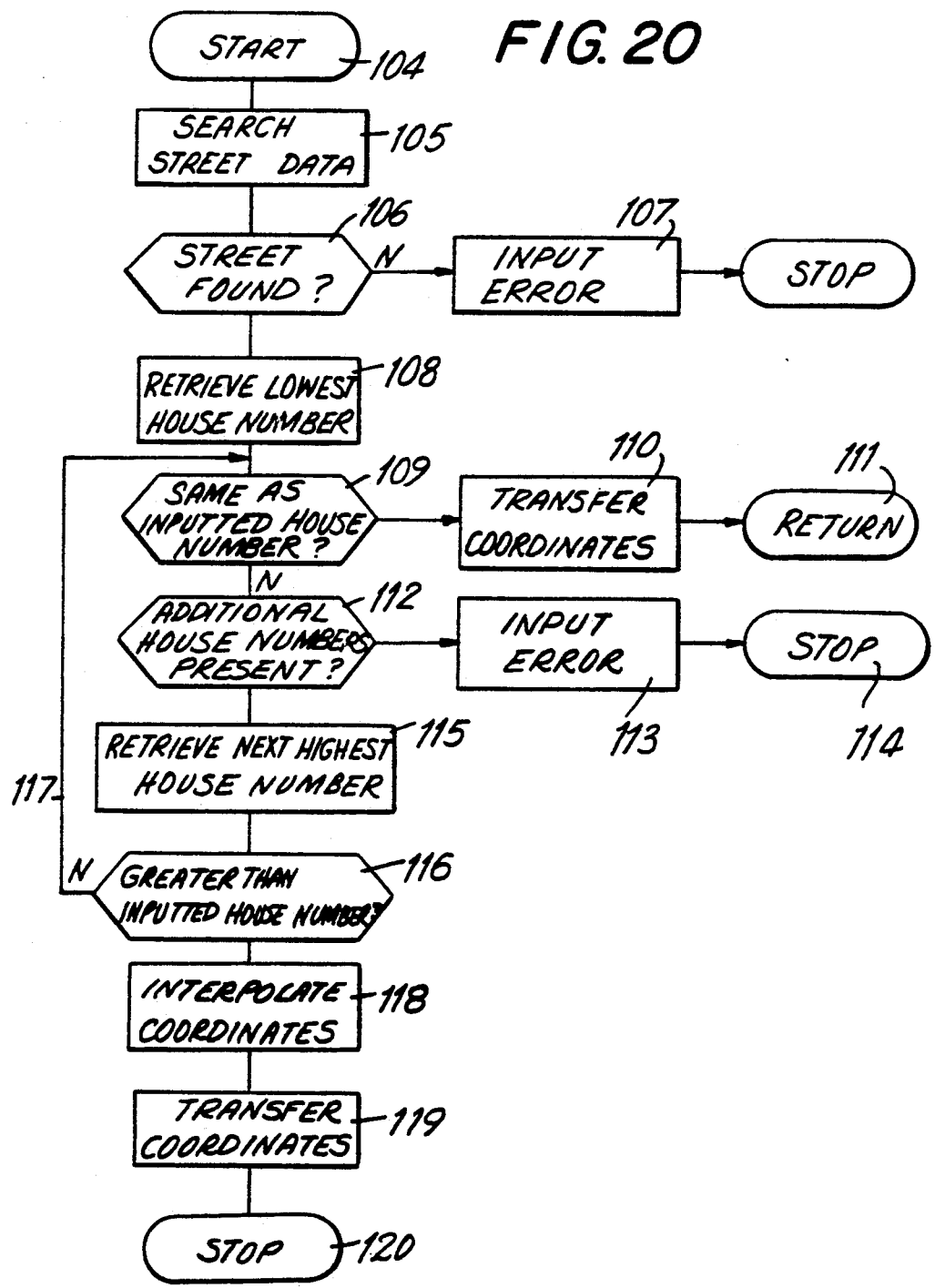

FIG. 20 shows the flow chart for determining the coordinates of the entered starting and destination points. After the start 104 of the subprogram, the data of the street system mapping stored in the data storage 82 is searched in step 105 with respect to the entered street identification character or possibly according to the entered street name. In step 106, it is determined whether or not the street was found. If not, this is indicated in step 107 via the LCD 85 and the input is interrupted. It can be repeated according to FIG. 19. If the street was found, the lowest house number of the stored reference points of this street is called from the data in step 108 and compared in step 109 with the entered house number. If the house numbers agree, the coordinates of the found reference point are taken over as starting and destination coordinates, respectively, in an overwritable part in the data storage 82 of the navigation system. A new input is requested in step 111. If the house numbers do not agree, additional house numbers are sought in step 112. If no further reference point house numbers are found, this is indicated on the LCD 85 in step 113 and the input is interrupted in step 114. It can be repeated according to FIG. 19. However, if additional house numbers were found, the next highest house number is called in step 115 and compared with the entered house number in step 116. If the latter is still not greater than the entered house number, the program jumps back to step 109 via a loop 117 and checks whether there is now agreement or whether there are still additional house numbers in the data.

This process is repeated until the house number called in step 115 agrees with the entered house number or is greater than the latter. In the latter case, the entered starting or destination point lies between the two reference points of the street called last. The coordinates of the starting and destination point must now be determined in step 118 by means of linear interpolation between the coordinates of the two last called and temporarily stored reference points corresponding to the difference between their house numbers. The coordinates determined in this way are assigned to the house number of the starting or destination point in step 119 and taken over in the overwritable part of the data storage 82 for navigation. The jumping back into the flow chart according to FIG. 19 is now affected in step 120.

This subprogram is to be run through in the same manner for entering the starting point as well as for entering one or more destination points. It is unimportant whether a house number on a street or square is entered as starting or destination point.

After the starting and destination points are entered, the navigation system determines a destination vector with the aid of the coordinates of the entered starting and destination points taken from the data storage or determined by means of interpolation by means of subtracting the coordinates of the starting and destination points. This destination vector is indicated on the LCD 85 in polar coordinates, wherein the directional arrow 95 shows the direction to the destination point and the display 88 indicates the direct distance between the starting and destination points. During the navigation driving, the respective location of the vehicle is determined with the aid of the known compound navigation and the destination vector is determined for a destination finding navigation in a known manner proceeding from the respective location of the vehicle and is displayed.

While the invention has been illustrated and described as embodied in a method of inputting and starting and destination points into a navigation system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method of inputting starting and destination points into an electronic navigation system of vehicle comprising the steps of:
   storing relevant data of street system maps in a data storage, which data contain a street identification character and coordinates of reference points of streets, with as assigned house number;
   entering the street identification character and the house number of one starting and destination points one after the other each time one of said starting and destination points is inputted into the navigation system;
   searching the data storage according to the entered street identification characters;
   comparing each said house number of reference points of a street found in the data storage during the searching with the inputted house number,
   transferring coordinates of the house number associated with one of said reference points into a storage of the navigation system when the inputted house number agrees with the house number associated with said one of said reference points;
   storing data of the reference points temporarily with house numbers adjacent to the inputted house number when the inputted house number diverges from the house numbers of the reference points present in the data storage; and
   determining coordinates of the inputted one of said starting and destination points by interpolating coordinates of the reference points with the adjacent house numbers and transferring the coordination of the inputted one of said starting points into the storage of the navigation system.

2. A method according to claim 1, wherein the street identification character consists of a number which is stored in a data file of the data storage containing the street list of the street system maps.

3. A method according to claim 1, further comprising the step of determining a destination vector from the coordinates of said starting and destination points determined by a navigation computer, and indicating the destination vector by the navigation system.

4. A method according to claim 3, comprising the step of converting the determined destination vector into polar coordinates and indicating it on a destination display and a distance-to-destination display.

* * * * *